United States Patent
Yoon et al.

(10) Patent No.: US 10,025,020 B2
(45) Date of Patent: Jul. 17, 2018

(54) BACKLIGHT APPARATUS AND 3D IMAGE DISPLAY APPARATUS INCLUDING THE SAME

(71) Applicant: SAMSUNG ELECTRONICS CO., LTD., Suwon-si (KR)

(72) Inventors: Jung-hoon Yoon, Yongin-si (KR); Ki-hyung Kang, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 120 days.

(21) Appl. No.: 15/134,461

(22) Filed: Apr. 21, 2016

(65) Prior Publication Data
US 2017/0108636 A1   Apr. 20, 2017

(30) Foreign Application Priority Data
Oct. 16, 2015  (KR) .......................... 10-2015-0144587

(51) Int. Cl.
*F21V 8/00* (2006.01)
*G02B 27/22* (2018.01)

(52) U.S. Cl.
CPC ......... *G02B 6/0038* (2013.01); *G02B 6/0061* (2013.01); *G02B 6/0068* (2013.01); *G02B 27/2214* (2013.01)

(58) Field of Classification Search
CPC .. G02B 6/0038; G02B 6/0061; G02B 6/0068; G02B 27/2214; G02B 6/0011; G02B 6/0033; G02B 6/0035; G02B 6/0036; F21V 2200/00; F21V 2200/20; G02F 1/133615
See application file for complete search history.

(56) References Cited

U.S. PATENT DOCUMENTS

| | | | | |
|---|---|---|---|---|
| 9,229,151 B2* | 1/2016 | Fujita | ................... | G02B 6/0055 |
| 9,354,450 B2* | 5/2016 | Pan | ................... | G02B 27/2214 |
| 2004/0252256 A1* | 12/2004 | Hsu | ....................... | G02B 6/0038 |
| | | | | 349/67 |
| 2014/0355113 A1* | 12/2014 | Pan | ................... | G02B 27/2214 |
| | | | | 359/462 |
| 2015/0085530 A1* | 3/2015 | Fujita | ................... | G02B 6/0053 |
| | | | | 362/626 |
| 2015/0293296 A1* | 10/2015 | Kikuchi | ............... | G02B 6/0051 |
| | | | | 362/606 |

* cited by examiner

*Primary Examiner* — Bao Q Truong
(74) *Attorney, Agent, or Firm* — Sughrue Mion, PLLC

(57) ABSTRACT

A 3D image display apparatus includes a display panel configured to display a multiview image, a light guide plate disposed in a rear of the display panel and spaced apart from the display panel, a main pattern repeatedly formed and spaced at a preset interval, and a light source configured to irradiate light to the light guide plate. A height of a sub pattern disposed in a light incident portion of the light guide plate near the light source among sub patterns constituting the main pattern is smaller than that of a sub pattern disposed in a central portion of the light guide plate.

12 Claims, 11 Drawing Sheets

X-TALK OCCURRENCE REGION

BACKLIGHT APPARATUS AND 3D IMAGE DISPLAY APPARATUS INCLUDING THE SAME

CROSS-REFERENCE TO RELATED APPLICATIONS

This application claims priority from Korean Patent Application No. 10-2015-0144587, filed on Oct. 16, 2015, in the Korean Intellectual Property Office, the disclosure of which is incorporated herein by reference in its entirety.

BACKGROUND

Field

Apparatuses and methods consistent with exemplary embodiments relate to a backlight apparatus and a three-dimensional (3D) image display apparatus including the same, and more particularly, to a backlight apparatus using a light guide plate configured of a preset pattern and a 3D image display apparatus including the same.

Description of the Related Art

Methods of implementing a 3D image may use the binocular parallax of a user. In implementing the 3D image using the binocular parallax, there may be a stereoscopic method and an autostereoscopic method.

The viewer may view a 3D image by wearing glasses for displaying the 3D image such as polarizing glasses or liquid crystal (LC) shutter glasses through the stereoscopic method. The stereoscopic method may be applied in a place in which people view the 3D image using a polarizing projector such as a theater. The viewer may view the 3D image using devices such as a lenticular lens, a parallax barrier, or a parallax illumination through the autostereoscopic method without the glasses. The autostereoscopic method may be applied to a display for a game, a home television (TV), a display for exhibition, and the like, which may be used by a person or few people.

SUMMARY

Exemplary embodiments may overcome the above disadvantages and other disadvantages not described above. Also, an exemplary embodiment is not required to overcome the disadvantages described above, and an exemplary embodiment may not overcome any of the problems described above.

One or more exemplary embodiments relate to a backlight apparatus in which a height of a pattern included in a light guide plate is applied according to a distance from a light source and a 3D image display apparatus including the same.

According to an aspect of an exemplary embodiment, there is provided a three-dimensional (3D) image display apparatus including: a display panel configured to display a multiview image; a light guide plate disposed in a rear of the display panel and spaced apart from the display panel; a main pattern in the light guide panel that is repeatedly formed and spaced at a preset interval; and a light source configured to irradiate light to the light guide plate, wherein a height of a sub pattern disposed in a light incident portion of the light guide plate near the light source among a plurality of sub patterns constituting the main pattern is smaller than the height of a sub pattern disposed in a central portion of the light guide plate.

A width of each sub pattern among the plurality of sub patterns constituting the main pattern of the light guide plate may be equal to each other.

The light source may include a first light source located near a first side of the light guide plate and a second light source located near a second side of the light guide plate.

The plurality of sub patterns constituting the main pattern may have heights increased toward the central portion compared to the light incident portions close to the first and second light sources.

The main pattern may be configured such that at least one sub pattern among the plurality of sub patterns is shifted in a crosstalk occurrence region.

The main pattern may be inclined to a preset angle, and the main pattern may be configured such that at least one sub pattern located in a crosstalk occurrence region is shifted left or right by a preset width with the preset angle.

The main pattern may be inclined to a preset angle, and the main pattern may be configured such that a first sub pattern located in the crosstalk occurrence region has continuity with a second sub pattern located in continuity with at least one of an upper side and a lower side of the first sub pattern, and may be tilted to a first angle that is different from a second angle of the second sub pattern.

The main pattern may be configured such that the first sub pattern tilted to a first angle and the second sub pattern tilted to a second angle that is different from the first angle may be alternately arranged.

The crosstalk occurrence region may be a region determined based on positions at which a plurality of image views having different viewpoints are arranged on the display panel.

According to an aspect of another exemplary embodiment, there is provided a backlight apparatus including: a light guide plate in which a main pattern is repeatedly formed and spaced at a preset interval; and a light source configured to irradiate light to the light guide plate, wherein a height of a sub pattern disposed in a light incident portion of the light guide plate near the light source among a plurality of sub patterns constituting the main pattern is smaller than the height of a sub pattern disposed in a central portion of the light guide plate.

A width of each sub pattern among the plurality of sub patterns constituting the main pattern of the light guide plate may be equal to each other.

The light source may include a first light source located near a first side of the light guide plate and a second light source located near a second side of the light guide plate.

BRIEF DESCRIPTION OF THE DRAWINGS

The above and/or other aspects will be more apparent by describing one or more exemplary embodiments with reference to the accompanying drawings, in which.

DETAILED DESCRIPTION OF EXEMPLARY EMBODIMENTS

Below, exemplary embodiments will be described in greater detail with reference to the accompanying drawings. It should be understood that the technology described may not be limited to an exemplary embodiment, and various modifications, equivalents, and/or alternatives of exemplary embodiments may be included. Like numerals refer to like elements throughout. As used herein, the term "and/or" includes any and all combinations of one or more of the associated listed items. Expressions such as "at least one of," when preceding a list of elements, modify the entire list of elements and do not modify the individual elements of the list.

It will be understood that the terms "comprises," "may comprise," "includes," and/or "may include," when used herein, indicate the presence of features (for example, numerical values, functions, operations, elements, and/or components), but do not preclude the presence or addition of one or more other features.

It will be understood that, although the terms first, second, etc., may be used to refer to elements without indicating an order and/or importance, such elements should not be construed as limited by these terms. The terms are used to distinguish one element from other elements. For example, a first element may refer to a second element, and a second element may refer to a first element.

It will be understood that when an element (for example, a first element) is referred to as being "(operatively or communicatively) coupled with/to" or "connected to" another element (e.g., a second element), it can be directly connected or coupled to the other element with intervening elements (e.g., third element). When an element is referred to as being "directly connected to" or "directly coupled to" another element, there are no intervening elements or layers.

The terminology used herein is for describing exemplary embodiments and is not intended to be limiting. As used herein, the singular forms "a", "an" and "the" are intended to include the plural forms as well, unless the context clearly indicates otherwise. In other words, elements referred to in the singular may include one or more elements, unless the context clearly indicates otherwise. Unless otherwise defined, all terms used herein have a meaning as understood by one of ordinary skill in the art. It will be further understood that terms should be interpreted as having a meaning that is consistent with their meaning in the context of the relevant art and will not be interpreted in an idealized or overly formal sense, unless expressly so defined.

Below, a backlight apparatus and a 3D image display apparatus including the same, according to an exemplary embodiment, will be described in detail with reference to the accompanying drawings.

Figure 1:
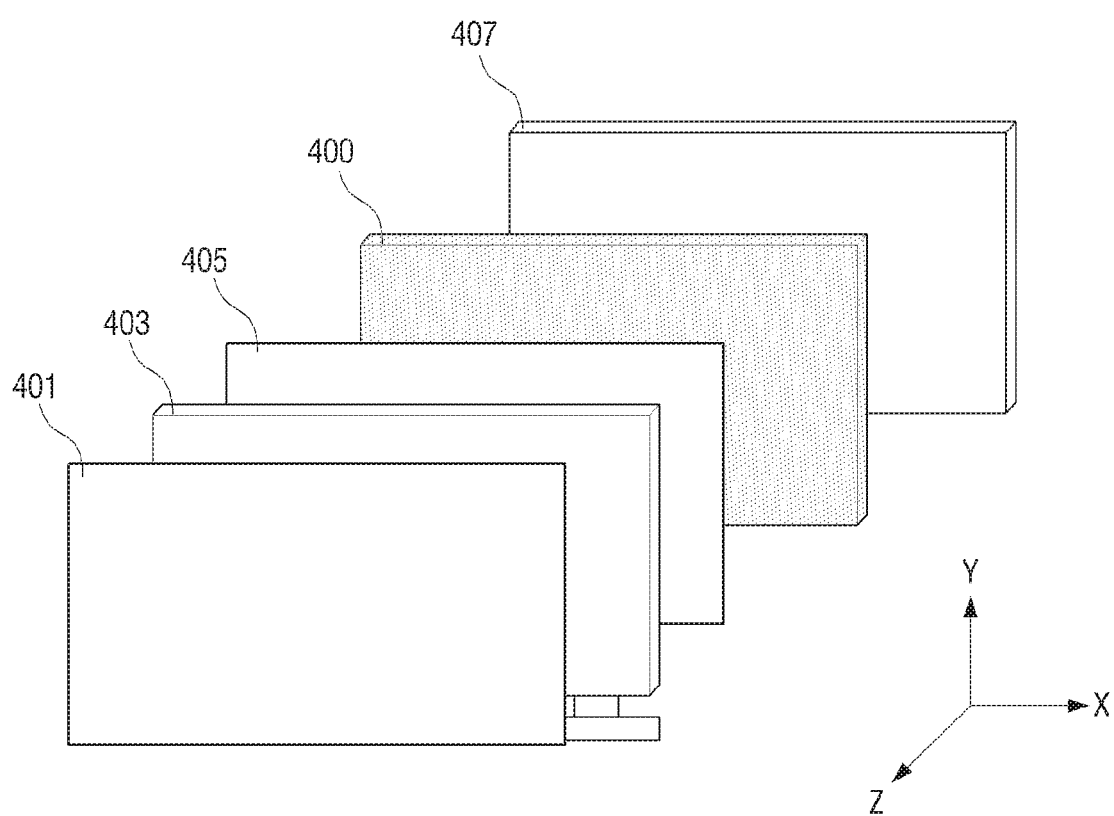
FIG. 1 is a diagram illustrating a configuration of a 3D image display apparatus, according to an exemplary embodiment.

FIG. 1 is a diagram illustrating a configuration of a 3D image display apparatus according to an exemplary embodiment. Referring to FIG. 1, the 3D image display apparatus may include polarizing films 401 and 405, a display panel 403, and backlights 400 and 407.

The polarizing films 401 and 405 may transmit only polarized light having a specific angle, and control transmittance of light through polarization control. The polarizing films 401 and 405 may be disposed in a front and rear of the display panel 403.

The display panel 403 may be configured to include a transmissive 2D display panel, for example, a transmissive liquid crystal display (LCD) panel. The display panel 403 may include a plurality of pixels configured of a red (R) pixel, a green (G) pixel, and a blue (B) pixel, and the plurality of pixels may be arranged in a matrix form.

The display panel 403 may display a 3D image. The display panel 403 may display the 3D image by selectively converting an image based on 3D image data and an image based on 2D image data. For example, the 3D image data may be data including a plurality of parallax images corresponding to a plurality of viewing angle direction in 3D display. If binocular 3D display is performed, the 3D image data may be data including a parallax image for left-eye display and a parallax image for right-eye display. Like a parallax barrier type 3D image display apparatus, in a 3D image display mode, a synthesized image which includes a plurality of parallax images having a stripe type may be generated and displayed in one screen.

The backlights 400 and 407 may include a first backlight 400 used to display a 3D image and a second backlight 407 used to display a 2D image. The 3D image display apparatus may enable selective conversion between the 3D display mode and the 2D image display mode using the first backlight 400 and the second backlight 407.

The first backlight 400 may include a light guide plate, a first light source, and a second light source. The light guide plate may be disposed in the rear of the display panel 403 and may emit light to the display panel 403. The first light source and the second light source may be located at both sides of the light guide plate facing each other and may irradiate light toward the light guide plate from opposite directions.

The light may be emitted in a preset direction. For example incident light may be emitted in a corresponding direction through various physical phenomena such as reflection, refraction, diffraction, or scattering by a pattern formed in the light guide plate. Below, for ease of description, the 3D image display apparatus will be described as if the light is emitted by pattern reflection. However, exemplary embodiments are not limited to this.

Figure 2:
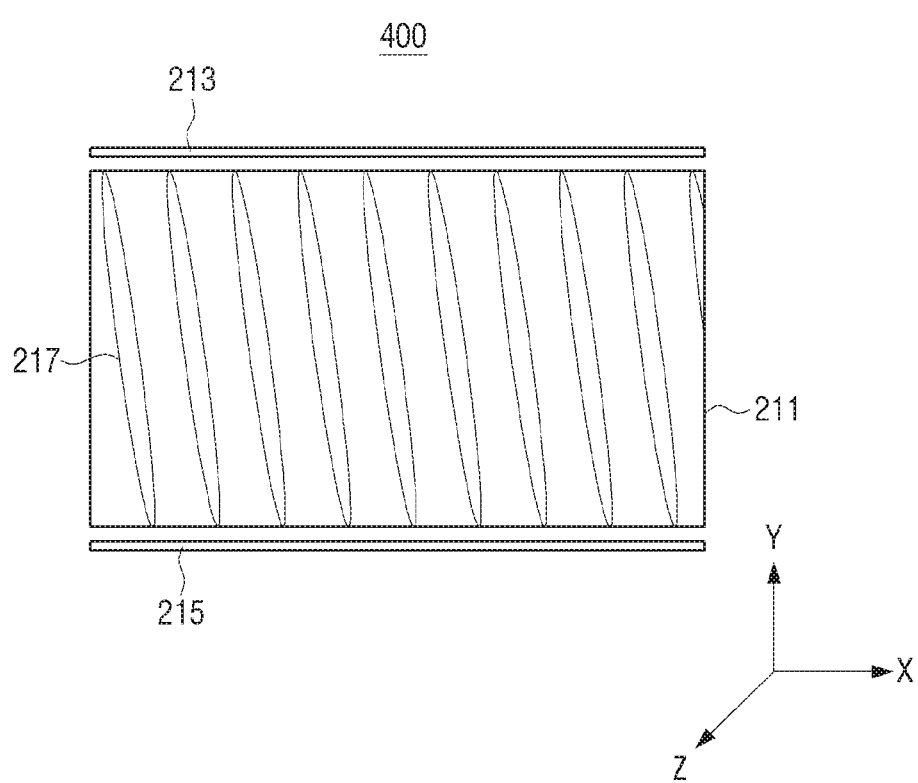
FIG. 2 is a diagram illustrating a backlight for 3D, according to an exemplary embodiment.

FIG. 2 is a diagram illustrating the first backlight 400 according to an exemplary embodiment. The first backlight 400 may be used to display a 3D image. Referring to FIG. 2, the backlight 400 may include a first light source 213, a second source 215, and a light guide plate 211. A pattern 217 may be formed in the light guide plate 211.

For example, the first light source 213 and the second light source 215 may be configured to include a fluorescent lamp such as a cold cathode fluorescent lamp (CCFL), a light emitting diode (LED), and the like. The first light source 213 and the second light source 215 may irradiate light toward the inside of the light guide plate 211 from the sides thereof.

The light guide plate 211 may be disposed in parallel to the display panel (see 403 of FIG. 1) and may have a quadrangular plate shape. For example, the light guide plate 211 may include a first incident surface and a second incident surface to which light is incident, an emitting surface which couples the first incident surface and the second incident surface and emits light, a reflection surface which couples the first incident surface and the second incident surface and faces the emitting surface, and the pattern 217 which is formed on the reflection surface to be spaced at a fixed interval and reflects the incident light to a direction within a preset threshold range. The direction within the preset threshold range may refer to the direction within the preset threshold range on the basis of a direction perpendicular to the reflection surface or the emitting surface of the guide light plate 211. That is, a direction (e.g., a Z-axis direction; hereinafter, referred to as a direction perpendicular to the light guide plate 211) perpendicular to a plane of the light guide plate 211. For example, the direction within the preset threshold range may be a direction within a range of ±20 to 30 degrees in the direction perpendicular to the light guide plate 211 to all directions. However, the value for the threshold range is not limited thereto.

The pattern 217 may be a prism formed on the reflection surface of the light guide plate 211 and may reflect light. A cross-section of the pattern 217 may have a right triangular shape, an asymmetrical triangular shape, a trapezoidal shape, or an elliptical shape. Exemplary embodiments are not limited to these.

A plurality of patterns 217 may be formed in the reflection surface of the light guide plate 211 and may be arranged in a 2D form. The plurality of patterns 217 may be formed as one line. That is, the plurality of patterns may constitute one line, and the light guide plate 211 may include a plurality of lines. The light reflected to the direction within the preset threshold range through the pattern 217 may be emitted to the outside of the light guide plate 211, and thus, the pattern 217 may serve as a line light source. The direction within the preset threshold range may be the direction within the preset threshold range on the basis of the direction perpendicular to the light guide plate.

Figure 3:
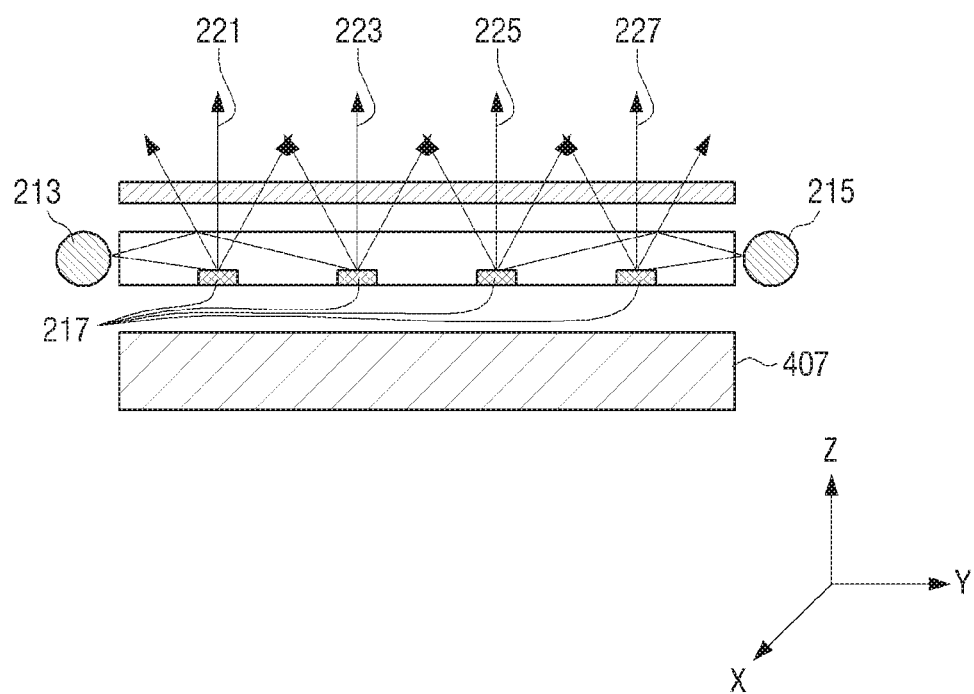
FIG. 3 is a cross-sectional view illustrating a backlight for 3D, according to an exemplary embodiment.

FIG. 3 is a diagram illustrating a cross-section of a first backlight according to an exemplary embodiment. Referring to FIG. 3, the first light source 213, the second light source 215, the pattern 217, and the second backlight 407 are illustrated. The light irradiated from the first light source may be incident to the incident surface of the light guide plate and travel to the inside of the light guide plate, and the traveling light may be reflected to the direction within the preset threshold range through the pattern 217 formed in the reflection surface of the light guide plate and emit the outside of the light guide plate. The lights 221, 223, 225, and 227 emitted to the outside of the light guide plate may be emitted like the line light in corresponding positions of the display panel, and a viewpoint image may be displayed in the display panel.

The second backlight 407 may serve as a surface light source, and emits light for 2D image display. That is, the second backlight 407 may emit light in the 2D image display, and the first light source 213 and the second light source 215 included in the first backlight may emit light in the 3D image display.

Figure 4:
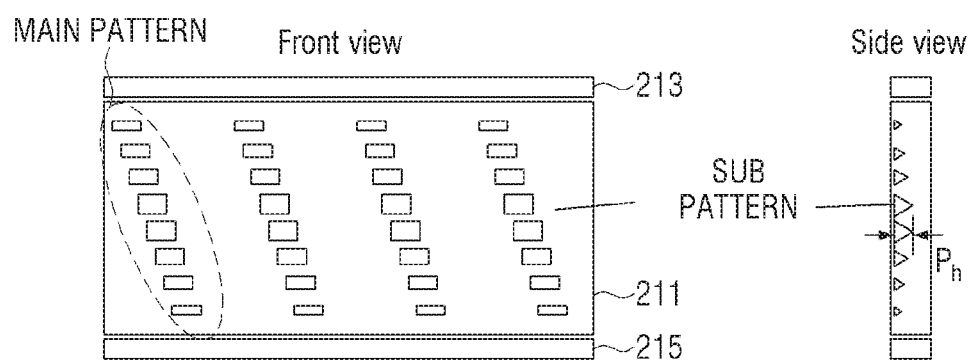
FIG. 4 is a diagram illustrating a pattern shape formed in a light guide plate, according to an exemplary embodiment.

FIG. 4 is a diagram illustrating a shape of a pattern formed in a light guide plate according to an exemplary embodiment.

Referring to FIG. 4, the light guide plate 211, the first light source 213, and the second light source 215 are illustrated. The first light source 213 may be located close to a first side of the light guide plate 211, and the second light source 215 may be located close to a second side of the light guide plate 211. The first light source 213 and the second light source 215 may be disposed to face each other.

The first light source 213 and the second light source 215 may be configured using a plurality of light emitting diodes (LEDs). The first light source 213 may be disposed in an upper side of the light guide plate 211 and irradiate light toward the incident surface of the light guide plate 211. The second light source 215 may be disposed in a position opposite to the first light source 211, i.e., in a lower side of the light guide plate 211, and may irradiate light toward the incident surface of the light guide plate 211.

The light guide plate 211 may have a quadrangular plate shape. For example, the light guide plate 211 may be configured of a transparent plastic plate formed of an acryl resin. All surfaces of the light guide plate 211 other than an internal reflection surface may be configured to be entirely transparent. For example, if the light guide plate 111 has a quadrangular plate shape, the emitting surface and four sides may be configured to be entirely transparent. The internal reflection surface may be mirror-finished to reflect light incident with an incident angle which satisfies a total reflection condition, and the light reflected to the direction within the preset threshold range on the basis of the direction perpendicular to the light guide plate 211 (i.e., the light which satisfies a total reflection condition may be emitted to the outside of the light guide plate).

A main pattern configured to reflect the incident light may be repeatedly arranged to be spaced at a fixed interval in the light guide plate 211. The light guide plate 211 may be implemented in such a manner that the main pattern and a non-pattern region are alternately arranged at a preset interval. The main pattern may be configured of a plurality of sub patterns. That is, the main pattern may refer to a set of sub patterns.

For example, as illustrated in FIG. 4, a height of a sub pattern arranged in a light incident portion of the light guide plate close to a light source among the sub patterns constituting the main pattern may be smaller than that of a sub pattern arranged in a central portion of the light guide plate. Widths of the sub patterns constituting the main pattern of the light guide plate 211 may be equal to each other.

According to an exemplary embodiment, the sub patterns constituting the main pattern may be formed in such a manner that the heights of the sub patterns are gradually increased toward the central portion from the light incident portions close to the first and second light sources. FIG. 4 illustrates that a cross-section of the sub pattern is a symmetrical triangular shape, but the shape of the cross-section of the sub pattern is not limited thereto. For example, the sub pattern may be implemented in various shapes for performing a function of the sub pattern such as an asymmetrical triangular shape, a quadrangular shape, an elliptical shape, or a trapezoidal shape, etc.

In some examples, an arrangement interval and an arrangement density of the sub pattern may be changed according to a distance from each light source. For example, in response to luminance of light emitted from the light guide plate being not adjusted to be entirely uniform through the adjustment of the height in the sub pattern, at least one of the arrangement interval and the arrangement density of the sub pattern may be additionally adjusted.

According to another exemplary embodiment, the main pattern may be configured in such a manner that a position of the sub pattern is shifted in a crosstalk occurrence region.

For example, the main pattern may be inclined to a preset angle, and the main pattern may be configured such that a sub pattern located in a crosstalk occurrence region is shifted to the left or right by a preset width with the preset angle.

According to an exemplary embodiment, the main pattern may be inclined to a preset angle, and the main pattern may be configured to be tilted to an angle different from a tilted angle of a sub pattern such that the sub pattern located in the crosstalk occurrence region has continuity with a sub pattern located in continuity with at least one of an upper side and a lower side of the sub pattern.

The crosstalk occurrence region may be a region calculated based on positions in which a plurality of image views having different view points are displayed on the display panel.

The drawing at the right of FIG. 4 is an enlarged cross-sectional view illustrating a portion of the main pattern. That is, the drawing at the right of FIG. 4 is a cross-sectional view of the light guide plate taken in a Y-axis direction. As illustrated in FIG. 4, the plurality of sub patterns constituting the main pattern may have the heights which are increased toward the central region of the light guide plate from the edge regions of the light guide plate close to the light sources. Accordingly, the luminance of the light emitted from the light guide plate for 3D may be uniform.

Figure 5:
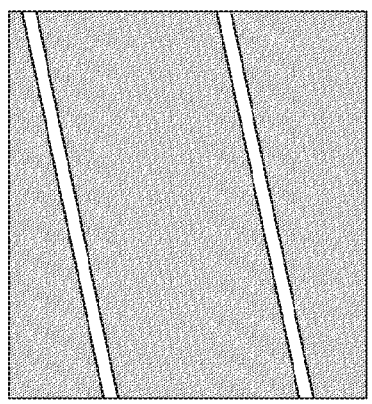
FIGS. 5 and 6 are diagrams illustrating an operation of a 3D image display apparatus, according to one or more exemplary embodiments.
Figure 5:
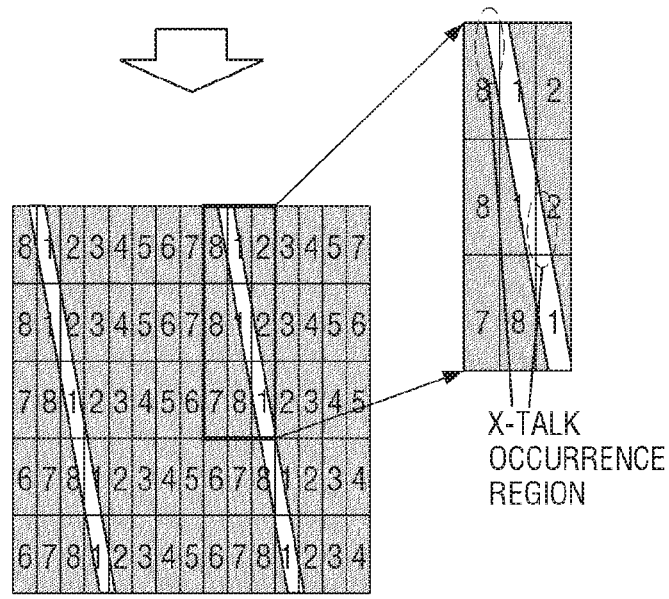

FIG. 5 is a drawing illustrating an operation of a 3D image display apparatus, according to an exemplary embodiment.

The autostereoscopic 3D image display apparatus may provide a 3D image through a viewing area separation unit tilted by a preset angle as illustrated in FIG. 5 and a display panel configured to display a multiview image.

Figure 6:
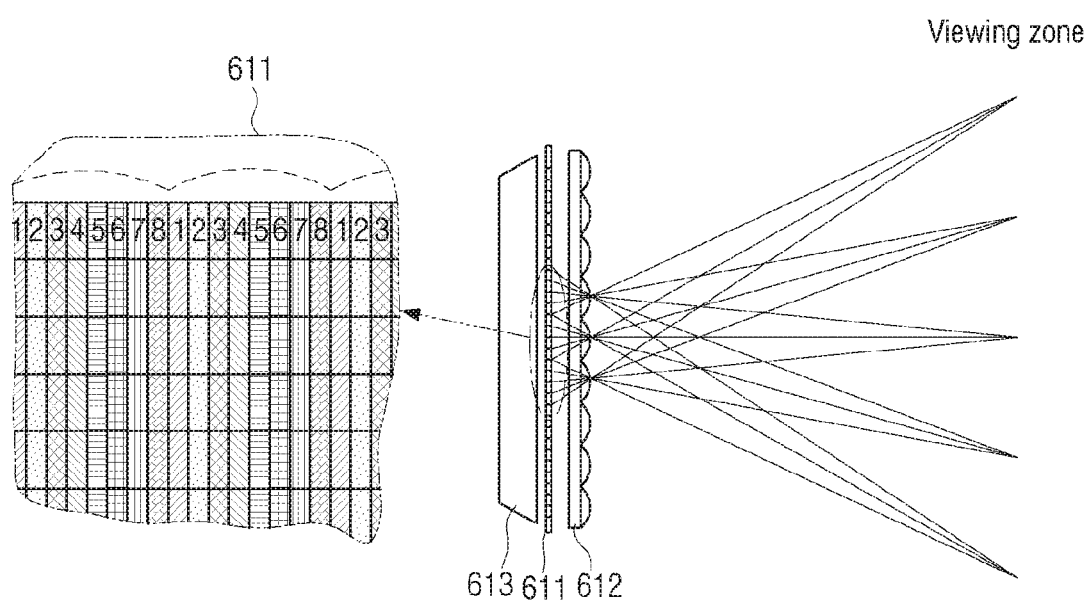

The multiview image displayed in the display panel may be provided by arranging sub pixel values constituting the plurality of image views having the different viewpoints on the display panel in a preset pattern. The viewing area separation unit may be the main pattern in the above-described structure. However, as illustrated in FIG. 6, the viewing area separation unit may be a lenticular lens 612 or a parallax barrier in a display panel structure in which the lenticular lens or the parallax barrier is disposed in front of a display panel 611. If the display panel 611 is an LCD panel, a backlight 613 may be included. If the display panel is a self-emissive display panel, such as an organic light emitting diode (OLED) panel, the backlight 613 may not be included.

The crosstalk occurrence region may be estimated based on arrangement positions of the plurality of image views, i.e., the sub pixel values constituting the plurality of image views and a tilted angle of the viewing area separation unit. According to an exemplary embodiment, the shape of the lenticular lens, the parallax barrier, or the main pattern of the light guide pattern may be changed to minimize the crosstalk in the crosstalk occurrence region. Hereinafter, for ease of description, the example in which the shape of the main pattern is changed in the structure using the light guide plate in which the main pattern is formed will be described.

Figure 7:
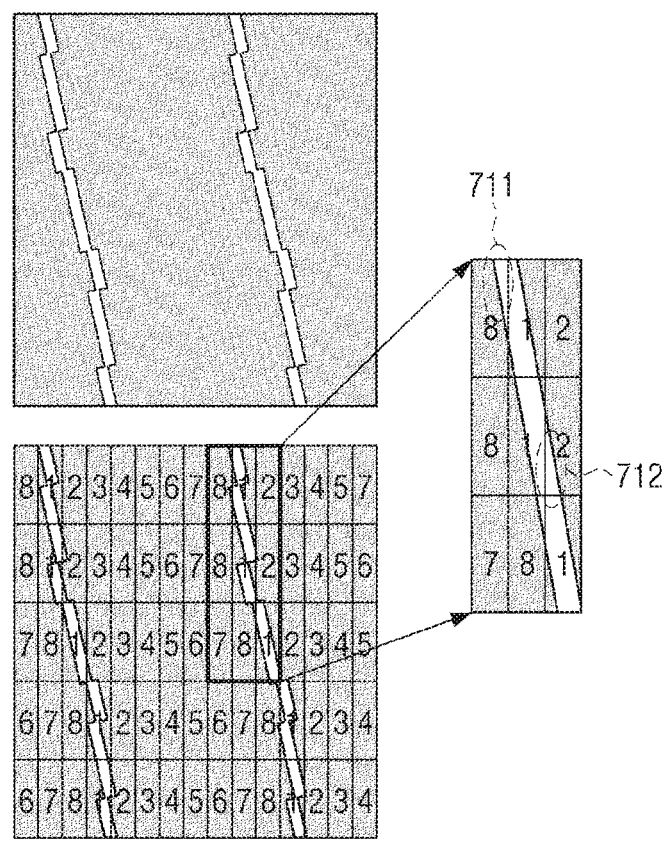
FIGS. 7 and 8 are diagrams illustrating an example of changing a shape of a main pattern to minimize crosstalk, according to one or more exemplary embodiments.
Figure 8:
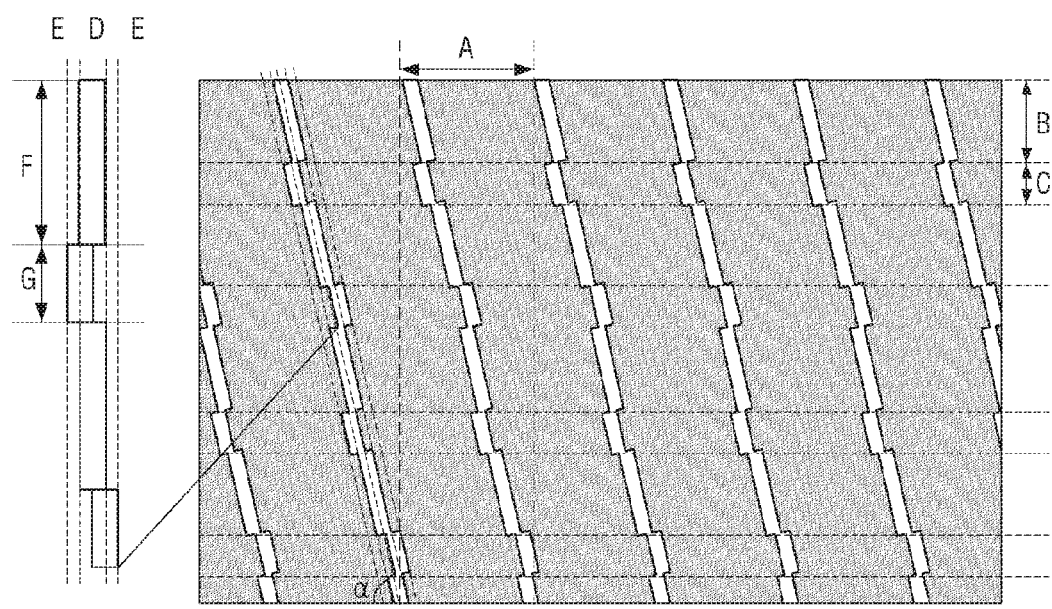

FIGS. 7 and 8 are diagrams illustrating an example of changing a shape of a main pattern to minimize crosstalk according to another exemplary embodiment.

As illustrated in FIG. 7, the crosstalk occurrence region may be minimized by configuring the main pattern of the light guide plate for 3D in such a manner that sub patterns located in crosstalk occurrence regions 711 and 712 are shifted left or right to appropriate positions.

As illustrated in FIG. 8, a height C and a width W of a region to be shifted left or right may be a height and a width of a region in which a neighboring viewpoint is viewed, i.e., the crosstalk occurrence region, and the height C and the width W of the region may be implemented to not deviate from the maximum width of the main pattern of the light guide plate for 3D. This is because if a viewing position is moved above and below when a left or right moving width of the sub pattern is larger than the width of the main pattern, parallax may occur. Thus, neighboring viewpoint interference in a specific region may be further increased.

Figure 9:
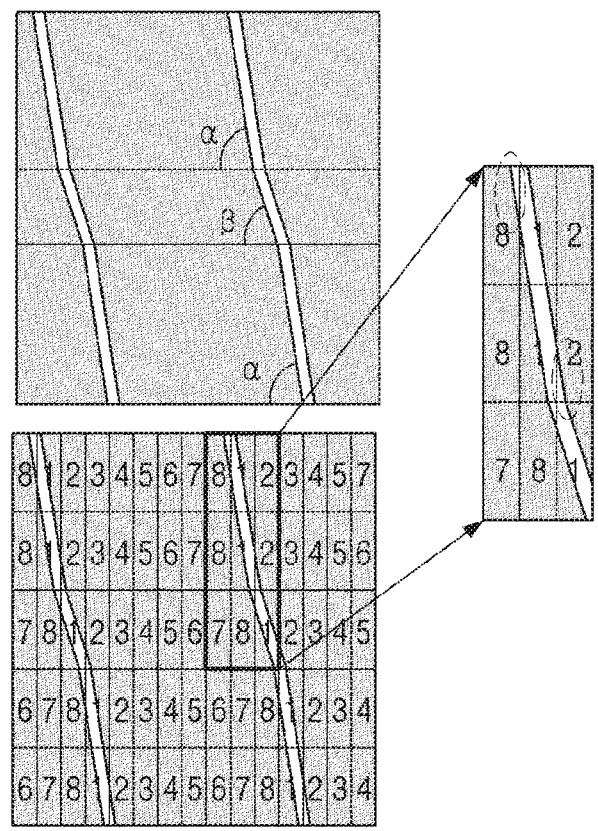
FIGS. 9 and 10 are diagrams illustrating another example of changing a shape of a main pattern to minimize crosstalk, according to one or more exemplary embodiments.
Figure 10:
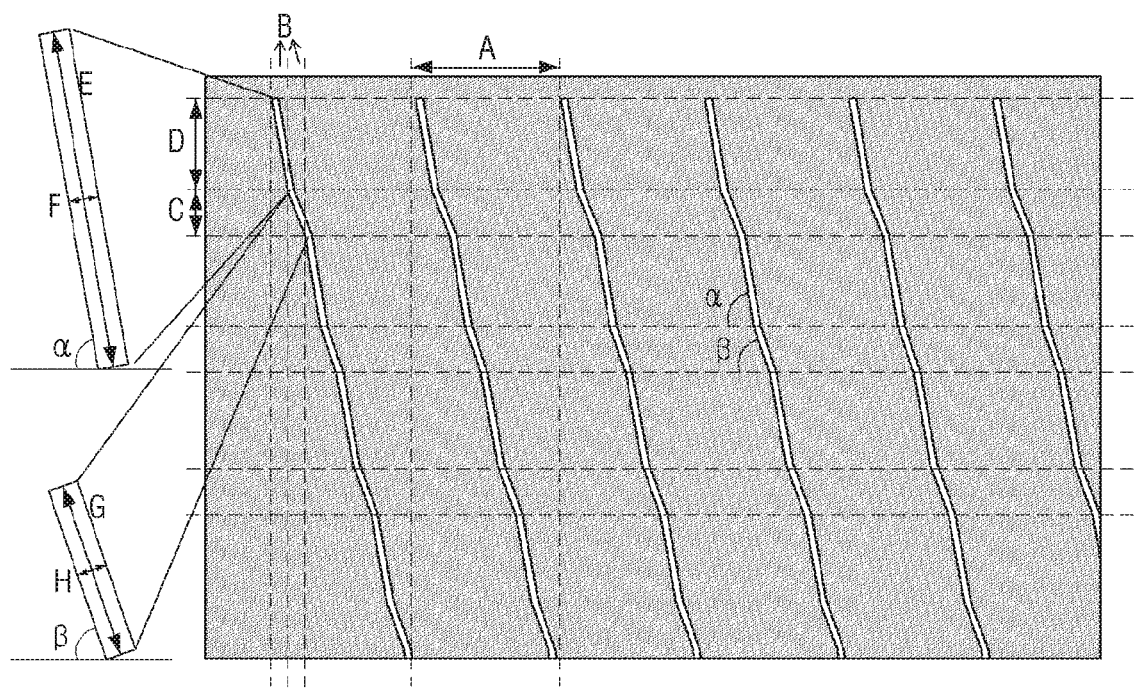

FIGS. 9 and 10 are diagrams illustrating another example of changing a shape of a main pattern to minimize crosstalk according to another exemplary embodiment.

As illustrated in FIG. 9, a main pattern may be implemented in such a manner that the first sub pattern located in the crosstalk occurrence region maintains the continuity with a second pattern located in continuity with at least one of an upper side and a lower side of the first sub pattern to a longitudinal direction and is tilted to an angle different from a tilted angle of the second pattern.

The main pattern may be implemented in such a manner that the first sub pattern tilted by a first angle (e.g., a) and the second sub pattern tilted by a second angle (e.g., 0) different from the first angle may be alternately arranged with the continuity to each other.

In some examples, a pattern mask for forming a main pattern may be formed as illustrated in FIGS. 9 and 10, and the main pattern may be formed using the pattern mask.

Figure 11:
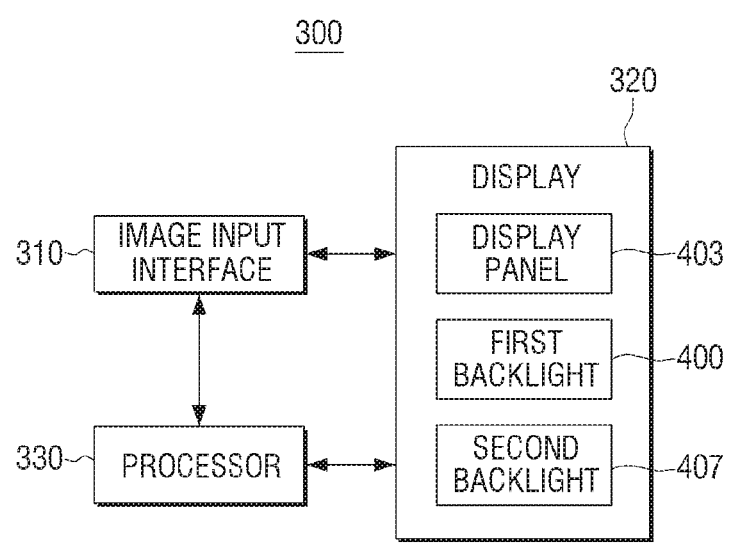
FIG. 11 is a block diagram illustrating a configuration of a 3D image display apparatus, according to an exemplary embodiment.

FIG. 11 is a block diagram illustrating a configuration of a 3D image display apparatus according to an exemplary embodiment.

Referring to FIG. 11, the 3D image display apparatus 300 may include an image input unit 310 (e.g., image input interface), a display 320, and a processor 330.

The 3D image display apparatuses 300 may be implemented with various types of display apparatuses, e.g., a TV, a monitor, a personal computer (PC), a kiosk, a tablet PC, an electronic photo frame, and/or a portable phone.

An image input unit 310 may receive an image. For example, the image input unit 310 may receive the image from an external storage medium, a broadcasting station, and various external apparatuses, such as a web server. The input image may be any one among a single view image, a stereoscopic image, and a multiview image. The single view image may be an image imaged through an imaging apparatus. The stereoscopic image which is a 3D video image represented with only a left-eye image and a right-eye image may be a stereoscopic image imaged through a stereoscopic imaging apparatus. The stereoscopic imaging apparatus may be an imaging apparatus including two lenses and may be used to image a stereoscopic image. The multiview image may be a 3D video image which provides various viewpoints for a plurality of directions to the user through geometric correction, spatial synthesis, and the like, on images imaged through one or more imaging apparatuses.

The image input unit 310 may receive depth information of an image. The depth of the image may be a depth value assigned to each pixel of the image, and for example, the 8-bit depth may have gray scale values from 0 (zero) to 255. For example, on the basis of black/white, the black (e.g., a low gray scale value) may represent a location far away from the viewer, and the white (e.g., a high gray scale value) may represent a location close to the viewer.

The depth information may be information indicating a depth of a 3D image, and the depth information may be information corresponding to the degree of binocular disparity between a left-eye image and a right-eye image constituting the 3D image. Degree of a 3D effect felt by the viewer may be changed according to the depth information. In response to the depth being large, because the binocular disparity is increased, the 3D effect may be relatively largely felt. In response to the depth being small, because the binocular disparity is reduced, the 3D effect may be relatively slightly felt. The depth information may be acquired through a passive method using only 2D characteristics of an image such as stereo matching and an active method using equipment such as a depth camera. The depth information may have a depth map form.

The depth map may refer to a table including pieces of depth information according to regions of an image. The regions may be divided in pixel units, and may be defined as a preset region larger than the pixel unit. For example, the depth map may have a form which represents a value smaller than 127 or 128 as a negative (−) value and a value larger than 127 or 128 as a positive (+) value using 127 or 128 among the gray scale values of from 0 to 255 as a reference value, that is, 0 (zero) (or focal plane). The reference value of the focal plane may be arbitrarily selected between 0 (zero) and 255. The negative (−) value may refer to subduction and the positive (+) value may refer to protrusion.

The display 320 may function to provide a plurality of optical views in a viewing zone of the user. The display 320 may include a display panel 403, a first backlight 400, and a second backlight 407.

The display panel 403 may include a plurality of pixels of which each includes a plurality of sub pixels. The sub pixels may include a red (R) sub pixel, a green (G) sub pixel, and a blue (B) sub pixel. That is, the pixels including the R, G, and B sub pixels may be arranged in a plurality of rows and a plurality of columns to constitute the display panel 403. The display panel 403 may be implemented with various display units, such as a liquid crystal display (LCD) panel, a plasma display panel (PDP), an OLED, a vacuum fluorescent display (VFD), a field emission display (FED), or an electro luminescence display (ELD).

The display panel 403 displays an image frame. For example, the display panel 403 may display a multiview image frame in which a plurality of views having different viewpoints may be repeatedly arranged in a serial manner. The first backlight 400 may be a backlight for a 3D image, and the second backlight unit 407 may be a backlight unit for a 2D image. The first and second backlights 400 and 407 may be the same as the first and second backlights 403 and 407 described above, and thus detailed description thereof will be omitted.

The processor 330 may control an overall operation of the 3D image display apparatus 300. The processor 330 may include at least one among a central processing unit (CPU), an application processor (AP), and a communication processor (CP).

The processor 330 may perform rendering on a plurality of image views having different viewpoints.

For example, in response to the input image being a 2D image, the processor 330 may perform rendering on the plurality of image views having the different viewpoints based on depth information extracted in 2D/3D conversion. In another example, in response to the plurality of image views having the different viewpoints and a plurality of pieces of depth information corresponding thereto being input, the processor 330 may perform rendering on the fixed number (hereinafter, referred to as N) of image views based on at least one of the plurality of input image views and one of the plurality of pieces of input depth information. In another example, in response to only the plurality of image views having the different viewpoints being input, the processor 330 may extract depth information from the plurality of image views and perform rendering on the N image views based on the extracted depth information.

The processor 330 may generate a multiview image to be displayed in the display 320 based on sub pixel values constituting the plurality of rendered image views having the different viewpoints. For example, the processor 330 may provide the multiview image by arranging the plurality of image views on the display panel 403 in a preset arrangement pattern.

The processor 330 may control the display panel 403 to be operated in a 3D mode that displays a 3D image or a 2D mode that displays a 2D image. In response to the 3D image display apparatus being operated as the 3D mode, the processor 330 may control the first light source and the second light source to alternately emit light, and the second backlight 407 to be turned off. In response to the 3D image display apparatus being operated as the 2D mode, the processor 330 may turn off the first light source and the second light source and turn on the second backlight 407.

According to the above-described exemplary embodiments, the brightness uniformity of a light guide plate for providing a 3D image may be improved. The crosstalk occurring due to an image view having a neighboring viewpoint may be reduced.

Exemplary embodiments are exemplary and are not to be construed as limiting. The present disclosure can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A three-dimensional (3D) image display apparatus comprising:
   a display panel configured to display a multiview image;
   a light guide plate disposed in a rear of the display panel and spaced apart from the display panel, the light guide plate comprising a main pattern repeatedly formed and spaced at a predetermined interval; and
   a light source configured to irradiate light to the light guide plate,
   wherein a height of a sub pattern disposed in a light incident portion of the light guide plate near the light source among a plurality of sub patterns constituting the main pattern is smaller than the height of a sub pattern disposed in a central portion of the light guide plate,
   wherein at least some sub patterns among the plurality of sub patterns are not arranged by a same line in a predetermined region, and
   wherein the predetermined region corresponds to an area of the multiview image which causes a crosstalk.

2. The 3D image display apparatus as claimed in claim 1, wherein a width of each sub pattern among the plurality of sub patterns constituting the main pattern of the light guide plate is equal to each other.

3. The 3D image display apparatus as claimed in claim 1, wherein the light source comprises a first light source located near a first side of the light guide plate and a second light source located near a second side of the light guide plate.

4. The 3D image display apparatus as claimed in claim 3, wherein the plurality of sub patterns constituting the main pattern have heights increased toward the central portion compared to the light incident portions close to the first and second light sources.

5. The 3D image display apparatus as claimed in claim 1, wherein the main pattern is configured such that the at least some sub patterns among the plurality of sub patterns is shifted in the predetermined region.

6. The 3D image display apparatus as claimed in claim 1, wherein the main pattern is inclined to a predetermined angle, and wherein the main pattern is configured such that the at least some sub patterns located in the predetermined region is shifted left or right by a predetermined width with the predetermined angle.

7. The 3D image display apparatus as claimed in claim 1, wherein the main pattern is inclined to a predetermined angle, and wherein the main pattern is configured such that a first sub pattern located in the predetermined region has continuity with a second sub pattern located in continuity with at least one of an upper side and a lower side of the first sub pattern, and is tilted to a first angle that is different from a second angle of the second sub pattern.

8. The 3D image display apparatus as claimed in claim 7, wherein the main pattern is configured such that the first sub pattern tilted to the first angle and the second sub pattern tilted to the second angle are alternately arranged.

9. The 3D image display apparatus as claimed in claim 1, wherein the predetermined region is a region determined based on positions at which a plurality of image views having different viewpoints are arranged on the display panel.

10. A backlight apparatus comprising:
a light guide plate in which a main pattern is repeatedly formed and spaced at a predetermined interval; and
a light source configured to irradiate light to the light guide plate, wherein a height of a sub pattern disposed in a light incident portion of the light guide plate near the light source among a plurality of sub patterns constituting the main pattern is smaller than the height of a sub pattern disposed in a central portion of the light guide plate, wherein at least some sub patterns among the plurality of sub patterns are not arranged by a same line in a predetermined region, and wherein the predetermined region corresponds to an area of a multiview image which causes a crosstalk.

11. The backlight apparatus as claimed in claim 10, wherein a width of each sub pattern among the plurality of sub patterns constituting the main pattern of the light guide plate is equal to each other.

12. The backlight apparatus as claimed in claim 10, wherein the light source comprises a first light source located near a first side of the light guide plate and a second light source located near a second side of the light guide plate.

* * * * *